United States Patent [19]
Yamaguchi et al.

[11] 3,883,084
[45] May 13, 1975

[54] FILM WRAPPING APPARATUS

[75] Inventors: Toshiaki Yamaguchi; Keizo Narita; Kimihiro Wada, all of Kyoto, Japan

[73] Assignee: Nishimura Seisakusho Co., Ltd., Kyoto, Japan

[22] Filed: Sept. 6, 1973

[21] Appl. No.: 394,842

[30] Foreign Application Priority Data
Dec. 12, 1972  Japan...................... 47-106,374

[52] U.S. Cl.............................................. 242/56 R
[51] Int. Cl............................................. B65h 19/20
[58] Field of Search....... 242/75.1, 74, 67.2, 67.1 R, 242/56 R

[56] References Cited
UNITED STATES PATENTS

| | | | |
|---|---|---|---|
| 3,163,066 | 12/1964 | Beaulieu | 242/56 R X |
| 3,279,716 | 10/1966 | Huck | 242/56 R |
| 3,633,839 | 1/1972 | Clark | 242/74 X |

*Primary Examiner*—Edward J. McCarthy
*Attorney, Agent, or Firm*—Morgan, Finnegan, Durham & Pine

[57] ABSTRACT

The film wrapping apparatus comprises a film winding core roller, means for driving said core roller for rotation, an endless belt pressed at a stretched portion thereof against the film winding core roller so that the endless belt is moved along with the film winding core roller, and pneumatic means for blowing air toward a region where the endless belt becomes into contact with the peripheral surface of the film winding core roller, whereby the wrapping of the film around peripheral surface of the film winding core roller is automatically initiated since the leading end portion of the film is introduced by the air blowing force between the endless belt and the peripheral surface of the core roller.

1 Claim, 1 Drawing Figure

PATENTED MAY 13 1975　　　　　　　　　　　3,883,084
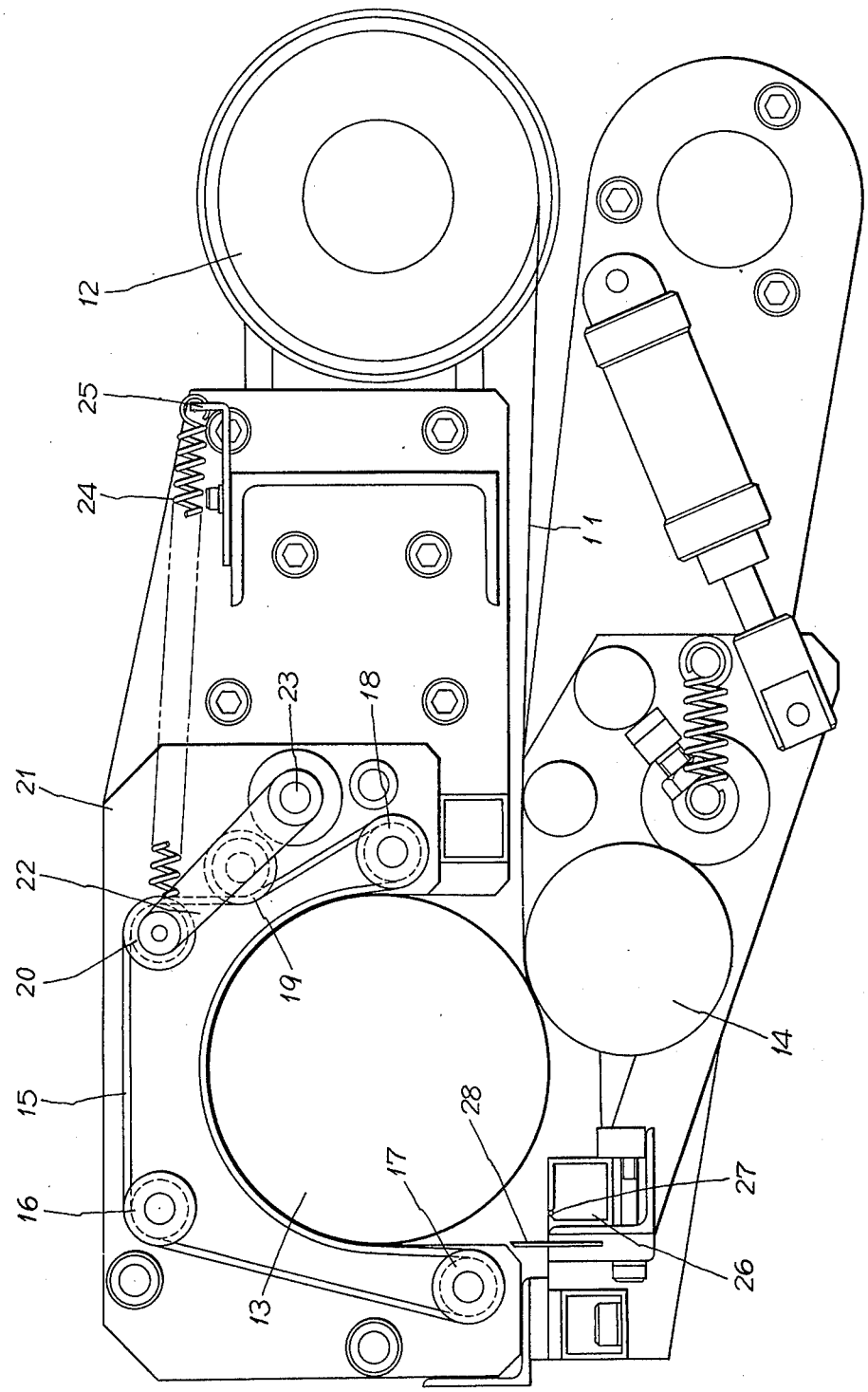

FILM WRAPPING APPARATUS

BACKGROUND OF THE INVENTION

This invention relates to film wrapping apparatus and more particularly to film wrapping apparatus in which the wrapping a film around a winding or rewinding core is automatically initiated.

In conventional film take-up or rewinding machines, the initiation of the wrapping of a continuous film or strip is usually carried out manually. Namely it is conventional to manually wrap the first some turns of a film or strip around a take-up or rewinding core roller.

Some attempts have been made to automatically initiate the wrapping of a continuous film or strip around a take-up or rewinding core roller. However, some of them involve disadvantages of complicated construction and expensiveness. In another attempt, the automatic initiation of wrapping a film around a winding core roller is not so reliable at all times.

The primary object of the invention is to provide a new and improved apparatus for automatically initiating the wrapping of a continuous film or strip around a take-up or rewinding core roller.

Another object of the invention is to provide a new and improved film wrapping apparatus in which the initiation of the wrapping of a continuous film or strip can be carried out automatically and with a high reliability.

A further object of the invention is to provide a new and improved apparatus for automatically initiating the wrapping of a continuous film or strip around a core roller utilizing an endless belt pressed against the core roller along its peripheral direction.

Other objects and advantages of the invention will become apparent from the following detailed description of the invention.

SUMMARY OF THE INVENTION

The film wrapping apparatus according to the invention includes a film winding core roller, means for driving said core roller for rotation, and an endless belt stretched between a plurality of pulleys. The endless belt is pressed at a stretched portion thereof against the film winding core roller along its peripheral direction so that the endless belt is moved a long with said film winding core roller. Preferably, the length of the stretched portion at which the endless belt is in contact with the peripheral surface of the winding core roller is at least half a round of the peripheral surface of the roller. The apparatus according to the invention also includes means for feeding a continuous film in a direction of its continuous length. The apparatus further includes pneumatic means for blowing air toward a region where the endless belt becomes into contact with the surface of the film winding core roller to introduce the leading end portion of the continuous film between the above mentioned stretched portion of the endless film and the film winding core roller at this region. In this manner the wrapping of the film around the peripheral surface of the film winding core roller is automatically initiated with the endless belt and peripheral surface of the film winding core roller holding the reading end portion of the film therebetween.

BRIEF DESCRIPTION OF THE DRAWING

For a better understanding of this invention, reference may be made to the accompanying drawing wherein:

FIGURE 1 is a schematic illustration of the apparatus for automatically wrapping a film embodying the invention.

DETAILED DESCRIPTION OF THE PREFERRED EMBODIMENT OF THE INVENTION

Referring now to the FIGURE, a continuous film sheet 11 is supplied from a film supply roll 12 and wrapped around the peripheral surface of a film rewinding core roller 13. The reference numeral 14 indicates a drive roller which is always in contact with the rewinding core roller 13. Accordingly, the core roller is driven by the drive roller 14 in the manner of a surface drive. The continuous film 11 is passed between the core roller 13 and the surface drive roller 14. Accordingly, the combination of the core roller 13 with the surface drive roller 14 constitutes means for feeding the continuous film 11 in a direction of its continuous length.

According to the invention, an endless belt is pressed against the film rewinding core roller 13. The endless belt 15 is stretched between a plurality of pulleys 16, 17, 18, 19 and 20. The pulleys 16, 17, 18 and 19 are rotatably supported by a support frame 21 at their respective fixed positions while the pulley 20 is movable supported by an arm 22 which is then pivotally supported at 23 by the support frame 21. The reference numeral 24 indicates a spring provided under tension between the arm 22 and a spring end support 25 which is fixedly mounted on the support frame 21. In this manner the arm 22 is always urged by the spring 24 in a clockwise direction. The movable pulley 20 which is supported by the arm 22 at its free end is also urged in a clockwise direction so that the whole length of the endless belt 15 is always under tension.

The endless belt 15 is pressed at a stretched portion between the pulleys 17 and 18 against the peripheral surface of the film rewinding core roller 13 along its peripheral direction. The contact pressure between the endless belt and the ccore roller 13 is given by the tension of the belt 15 which is ultimately given by the spring 24. In this manner the endless belt is moved along with the film rewinding core roller 13 when the latter is driven by the surface drive roller 14.

It is desirable that the endless belt is in contact with the peripheral surface of the core roller 13 with a relatively long length. Preferably the length of the stretched portion at which the endless belt 15 is in contact with the peripheral surface of the core roller 13 is greater than half a round of the peripheral surface of the core roller 13.

According to the invention air blowing means 26 is provided near and below the pulley 17. Air blowing means 26 serves to blow air upwardly through an air aperture 27 formed at its top wall. The air blowed out from the air aperture 27 is directed toward the region where the endless belt 15 becomes into contact with the surface of the film rewinding core roller 13 to introduce the leading end portion of the continuous film between the endless belt and the peripheral surface of the core roller 13.

The reference numeral 28 indicates a cutter for cutting the film 11. The cutter 21 is located immediately in the front of air blowing means 26.

In the usual rewinding operation, the assembly comprising the rewinding core roller 13 and the endless belt 15 is in a retracted position at which the core roller 13 is apart from the surface drive roller 14.

The continuous film supplied from the supply roll 12 is fed foward through the surface drive roller 14 and the position immediately above air blowing means 26 and cutter 28 to be rewound by a rewinding roll (not shown) which is located in the front of the cutter 28.

Upon completion of rewinding a predetermined length of the film onto the rewinding roll, the new rewinding core roller 13 with the endless belt 15 becomes into contact with the surface drive roller 14 so that the new rewinding core roller may be driven for rotation. At this moment the cutter 28 cuts the film 11 and air blowing means 26 begins to blow out air through the air aperture 27 upwardly, i.e., toward the region where the endless belt 15 becomes into contact with the peripheral surface of the film rewinding core roller 13. The leading end portion of the film 11 is thereby introduced toward the region between the pulley 17 and the peripheral surface of the core roller 13 opposing to the pulley 17 and thereafter between the endless belt and the peripheral surface of the core roller 13. In this manner the wrapping the film around the core roller 13 is automatically initiated.

When the film is wrapped around the core roller 13 by some necessary turns in the above mentioned manner, the core roller 13 is transferred to the rewinding operative position in the front of the cutter 28. This transfer of the core roller 13 may be carried out by any suitable means.

As is clear from the above disclosure, according to the invention, since the leading end portion of the film is drawn by air into the region where the endless belt 15 becomes into contact with the peripheral surface of the film rewinding core roller 13 and is then wrapped around the peripheral surface of the core roller in cooperation with the endless belt 15, the wrapping of the film around the core roller can be automatically initiated without fault.

The above embodiment referring to the drawing relates to film wrapping apparatus in which a continuous film sheet is rewound onto a core roller. It should, however, be noted that the invention can be applied to any forms of rewinding and take-up rolls in which a continuous film sheet or a slitted film strip or the like is rewound or take-up.

What we claim is:

1. A film wrapping apparatus comprising a film winding core roller, means for driving said core roller for rotation, an endless belt stretched between a plurality of pulleys, said endless belt being pressed at a stretched portion thereof against said core roller along its peripheral direction so that said endless belt is moved along with said core roller, means for feeding a continuous film in a direction of its continuous length, cutting means for cutting said continuous film at a fixed position during its feeding to form a new leading end of said continuous film, air blowing means located immediately before said cutting means, said air blowing means facing the region where said endless belt contacts the surface of said core roller to introduce said leading end portion of said continuous film between said stretched portion of said endless belt and said core roller at said region, whereby the wrapping of said film around the peripheral surface of said core roller is automatically initiated with said endless belt and said peripheral surface of said film winding core roller holding the leading end portion of said film therebetween.

* * * * *

UNITED STATES PATENT OFFICE
CERTIFICATE OF CORRECTION

PATENT NO. : 3,883,084
DATED : May 13, 1975
INVENTOR(S) : Toshiaki Yamaguchi; Keizo Narita; Kimihiro Wada It is certified that error appears in the above-identified patent and that said Letters Patent are hereby corrected as shown below:

Title Page, under "[30]", change "Dec. 12, 1972" to -- Sept. 12, 1972 --.

Signed and Sealed this fourteenth Day of October 1975

[SEAL]

Attest:

RUTH C. MASON
*Attesting Officer*

C. MARSHALL DANN
*Commissioner of Patents and Trademarks*